Nov. 25, 1958     A. J. GRANBERG     2,861,747
REPEATING COUNTER AND CONTROL FOR CONTAINER FILLING SYSTEMS
Filed July 6, 1953     7 Sheets-Sheet 1
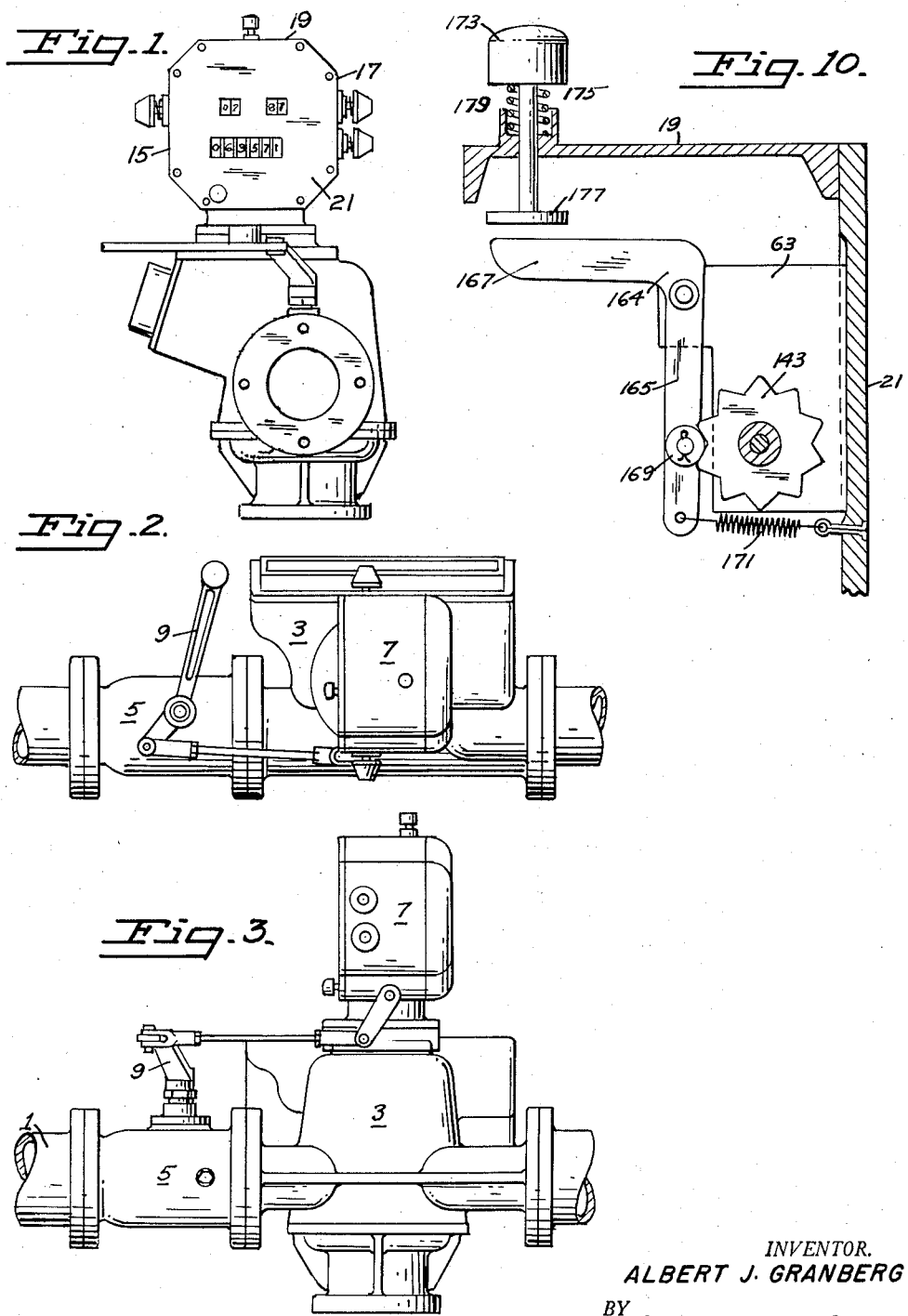
INVENTOR.
ALBERT J. GRANBERG
BY Bruce & Brosler
HIS ATTORNEYS

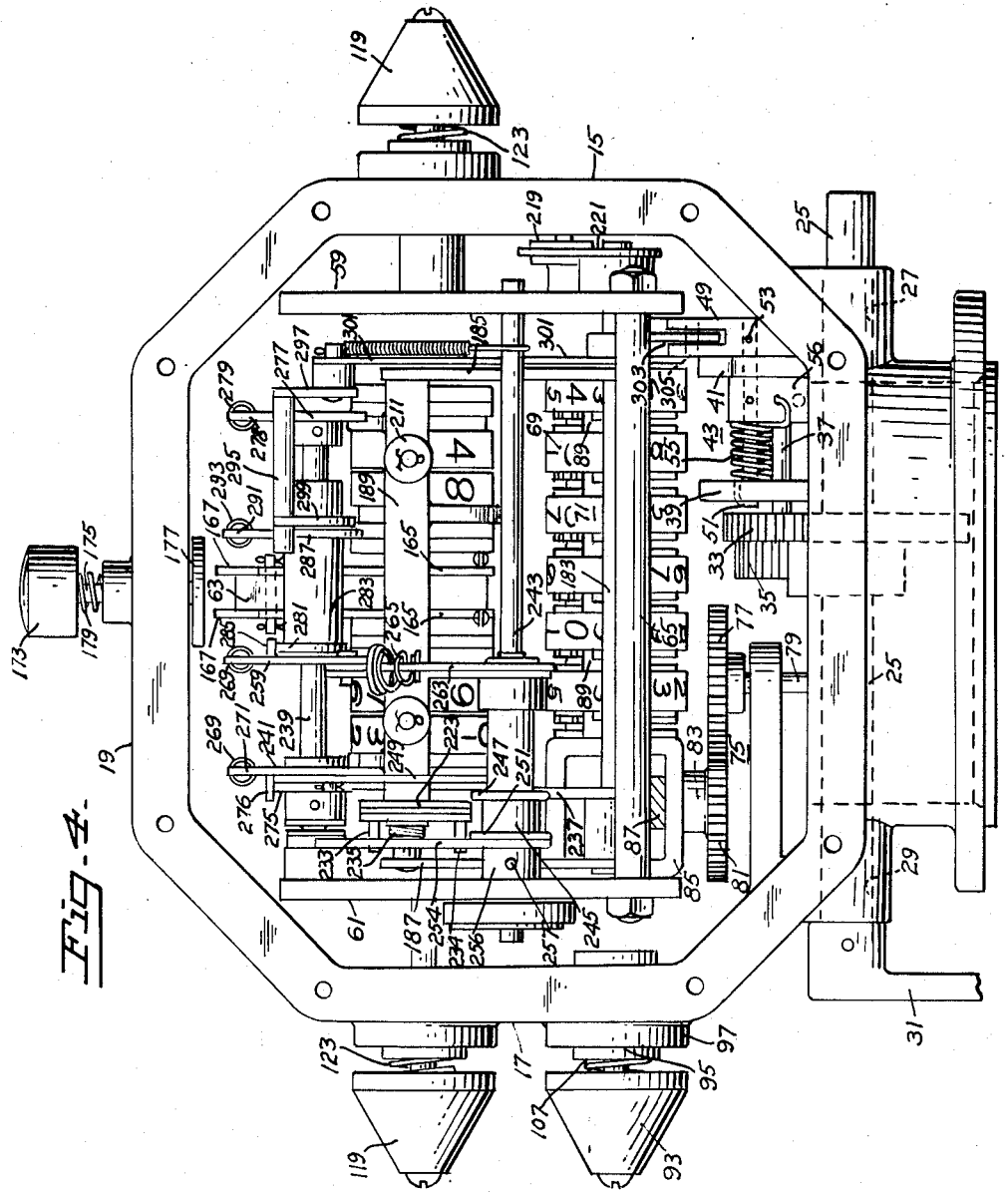

Nov. 25, 1958　　　A. J. GRANBERG　　　2,861,747
REPEATING COUNTER AND CONTROL FOR CONTAINER FILLING SYSTEMS
Filed July 6, 1953　　　　　　　　　　　7 Sheets-Sheet 3
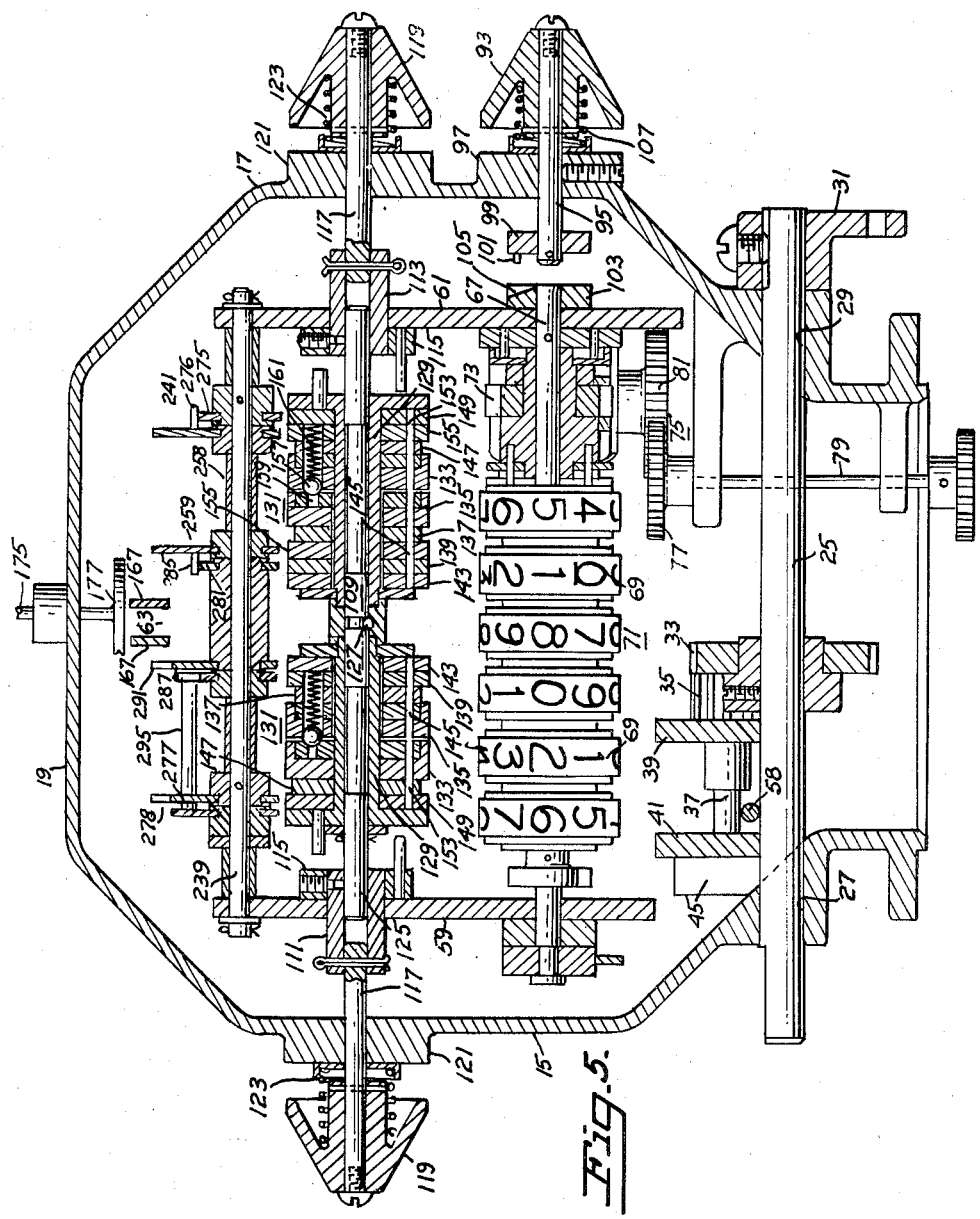
INVENTOR.
ALBERT J. GRANBERG
BY
Bruce & Brosler
HIS ATTORNEYS Nov. 25, 1958
A. J. GRANBERG
2,861,747
REPEATING COUNTER AND CONTROL FOR CONTAINER FILLING SYSTEMS
Filed July 6, 1953
7 Sheets-Sheet 4
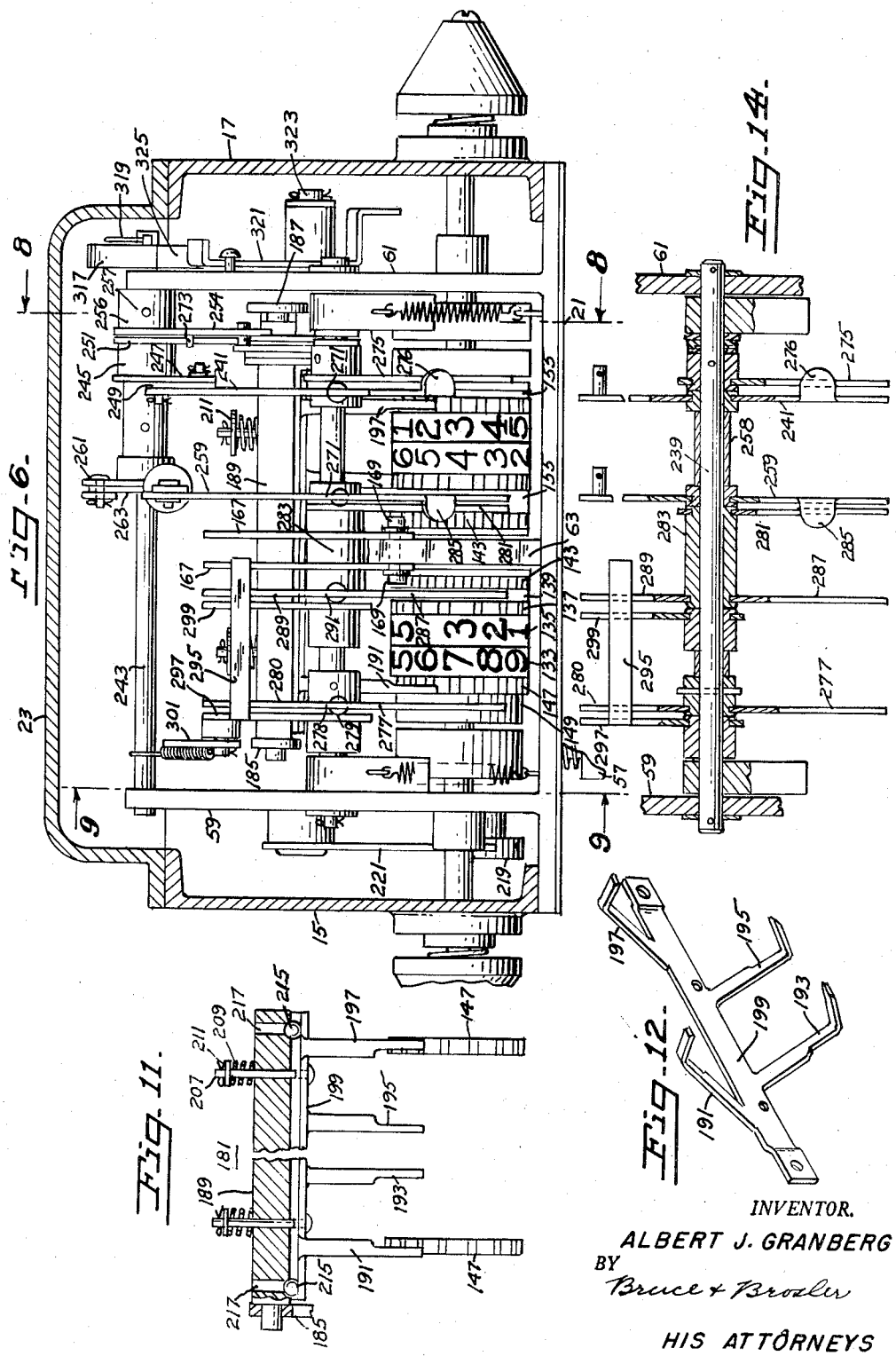
INVENTOR.
ALBERT J. GRANBERG
BY
*Bruce & Brosler*
HIS ATTORNEYS

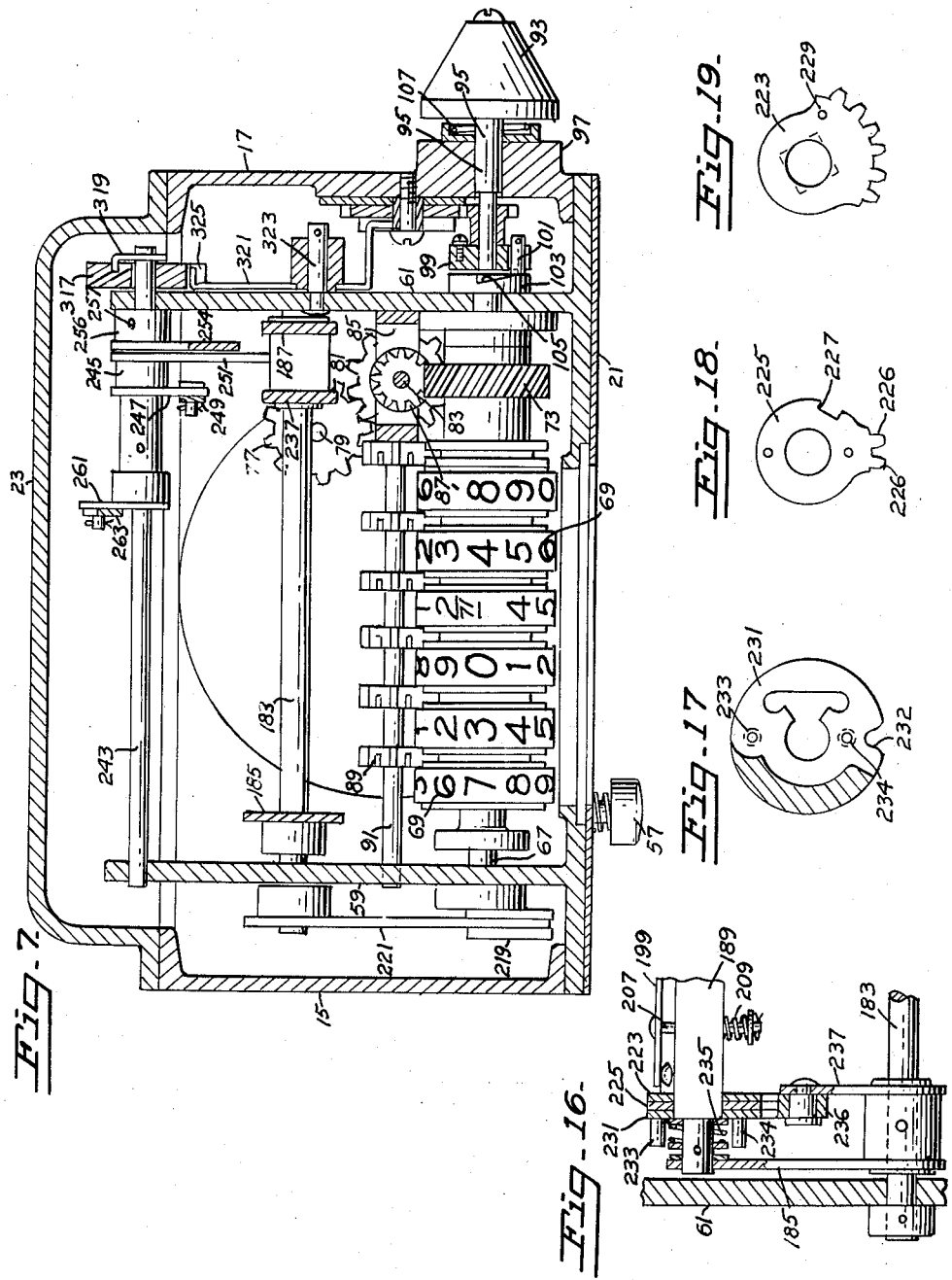

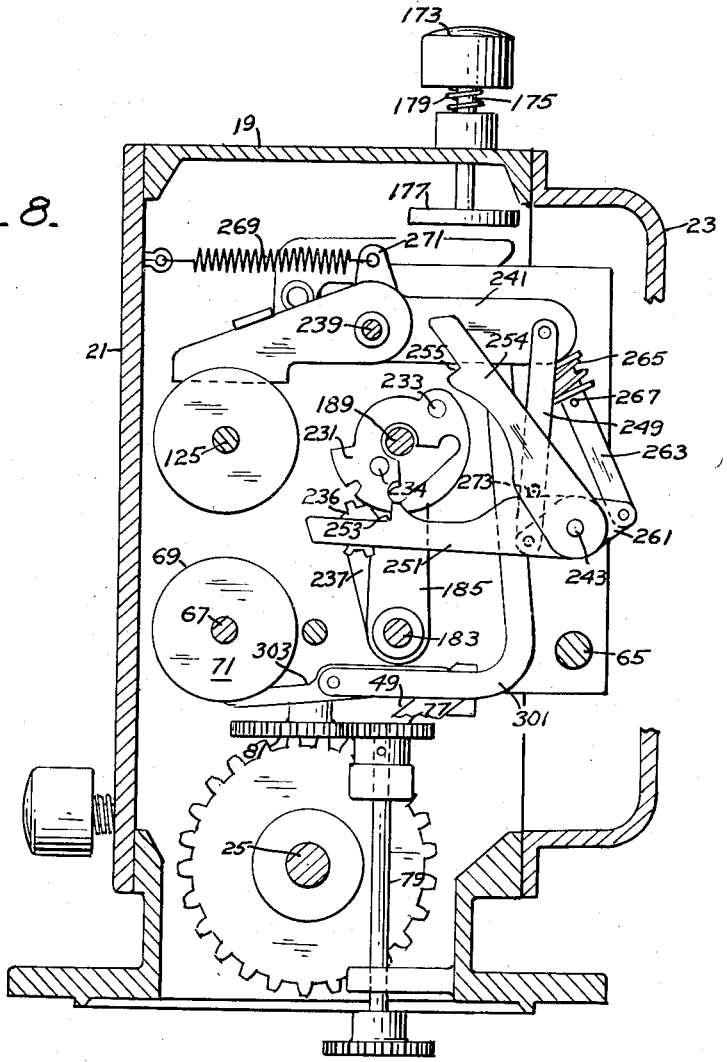

Nov. 25, 1958　　　　A. J. GRANBERG　　　　2,861,747
REPEATING COUNTER AND CONTROL FOR CONTAINER FILLING SYSTEMS
Filed July 6, 1953　　　　　　　　　　　　　7 Sheets-Sheet 7
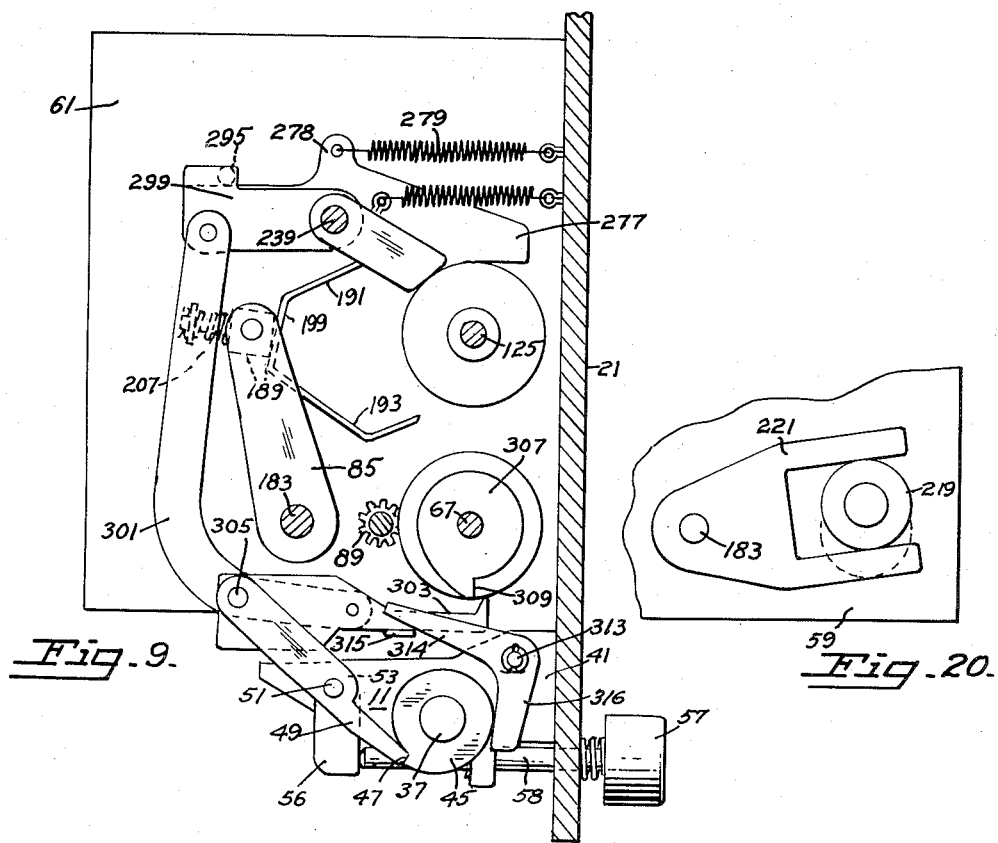
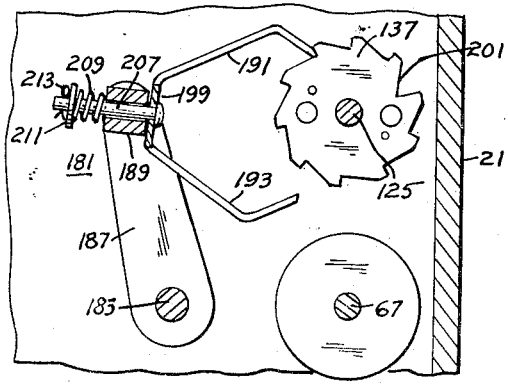
INVENTOR.
ALBERT J. GRANBERG
BY
Bruce & Brosler
HIS ATTORNEYS United States Patent Office 2,861,747
Patented Nov. 25, 1958

2,861,747

REPEATING COUNTER AND CONTROL FOR CONTAINER FILLING SYSTEMS

Albert J. Granberg, Oakland, Calif.

Application July 6, 1953, Serial No. 366,220

6 Claims. (Cl. 235—132)

My invention relates to systems for filling containers with a liquid commodity such as oil, gasoline or the like and more particularly with means for determining the quantity of liquid going into such containers.

Certain of such systems are designed to fill a large number of containers of equal volume in sequence and the present invention relates to a specific counting mechanism adapted to measure out the required volume for each such container.

Among the objects of the present invention are:

(1) To provide a novel and improved repeating counter;

(2) To provide a novel and improved repeating counter which automatically shuts off the flow of liquid through an associated line when a filling operation is completed;

(3) To provide a novel and improved repeating counter which requires no resetting adjustment between counting operations;

(4) To provide a novel and improved counter for use in container filling equipment, which counter automatically resets itself in response to the opening of a flow control valve in a filling line.

Additional objects of the invention will be brought out in the following description of a preferred embodiment of the same taken in conjunction with the accompanying drawings wherein:

Figure 1 is a view depicting the counter of the present invention, mounted on a meter in a liquid dispensing system;

Figure 2 is a plan view looking down on the assembly of Figure 1;

Figure 3 is a side elevational view of the assembly of Figure 1;

Figure 4 is a rear view in elevation of the counter of the present invention, with the rear wall removed;

Figure 5 is a front view in section through the counter;

Figure 6 is a plan view of the counter with the roof removed;

Figure 7 is a view similar to Figure 6 but taken in a lower plane;

Figure 8 is a view taken in the plane 8—8 of Figure 6;

Figure 9 is a view in section in the plane 9—9 of Figure 6;

Figure 10 is a fragmentary view, partly in section, of a holding feature, employed in adjustment of the counter wheels;

Figure 11 is a view of a picker-pawl assembly employed in the actuation of the counter wheels;

Figure 12 is a three dimensional view of a component of the picker-pawl assembly of Figure 11;

Figure 13 depicts the picker-pawl assembly of Figure 12 in its functional relationship to other components of the counter;

Figure 14 is a view, partly in section, of a cam follower assembly utilized in controlling the various operative functions of the counter of the present invention;

Figure 15 is a view of one of many cams employed with the cam follower assembly of Figure 14;

Figure 16 is a fragmentary view depicting a shift assembly utilized in conjunction with the picker-pawl assembly of Figure 11;

Figures 17, 18 and 19 are views illustrating components of the shift assembly of Figure 16;

Figure 20 is a fragmentary view depicting means for imparting oscillatory movement to the picker-pawl assembly of Figure 11.

Referring to the drawings for details of the present invention in its preferred form, the counting mechanism to which the present invention specifically relates, forms part of a liquid dispensing system involving a supply line 1 (Figure 3) in which a liquid meter 3 is installed in conjunction with an associated main valve 5 to control the flow of liquid in the system and through the meter. The counting mechanism 7 is mounted on the meter and responds to operation thereof to record the quantity of fluid flowing through the meter in the system.

The main valve is normally a spring-closing valve and is provided with an opening handle 9 having one end linked to a latching mechanism 11 in the counter for holding the valve in its open position against the closing tendency of the valve spring, until the counting mechanism reaches a predetermined value at which time it trips the latching mechanism and permits the main valve to close.

The counting mechanism is enclosed within a housing involving side walls 15 and 17, a roof 19, a front wall 21, and a rear wall 23 in the form of a cover plate adapted to be bolted into position.

The valve latching mechanism is located in the lower portion of this housing and includes a shaft 25 (Figures 4, 5 and 8) journaled in side wall bearings 27, 29, each end of the shaft extending externally of the housing to selectively mount a lever arm 31 which is adjustably linked to the control handle 9 of the main valve. Thus, a swinging movement of the valve handle to its opening position will cause an angular rotation of the shaft 25.

Mounted on this shaft for rotation therewith is a gear 33 (Figure 5). This gear is maintained in mesh with a pinion 35 on a short shaft 37 which is journaled in two arms 39, 41 of a bracket 43 mounted on and extending rearwardly of the front wall.

On the other end of this short shaft there is mounted a cam 45 (Figures 5, 9) having a spiral contour providing a shoulder stop 47. Riding the edge of this cam is a latching pawl 49 which is mounted on a shaft 51 supported between the arms of the bracket and fixed thereto by a pin 53 running through the pawl and shaft. The latching end of the pawl is held against the rim of the cam 45 by a biasing torsion spring 55 which is anchored at one end to the bracket arm 39, and at its other, against a pawl trip lever 56 which, like the pawl, is also pinned to the shaft 51. This pawl trip lever 56 is adapted to be actuated by a spring biased knob 57 at the front of the counter, and having a push rod 58 passing through the front wall of the housing and contacting the trip lever.

Extending rearwardly from the front wall and affixed thereto, are a pair of spaced bracket plates 59 and 61 (Figures 4, 6) and from a midway point on the front wall extends a smaller intermediate bracket plate 63, these three plates constituting the means for mounting and supporting the counting mechanism within the counter housing. A rod 65 connecting the two outermost plates at their lower rear corners serves to rigidly hold these two plates in their assigned positions.

Journaled in the two outermost bracket plates is a shaft 67 (Figures 5, 7) on which are rotatably mounted the various number wheels 69 of a conventional type counting mechanism 71 employed in the present counter, to totalize the quantity of liquid flowing through the meter of the system.

Adjacent the first or units wheel is an operating gear 73 for this counting mechanism, this operating gear being driven from the meter 3 by means of a gear drive 75. This drive involves a gear 77 mounted at the upper end of a vertical shaft 79 extending upwardly into the counter housing from the meter below, this gear being maintained in mesh with a similar gear 81 disposed at the lower end of a worm gear shaft 83 which is journaled in the parallel sides of a bracket 85 extending inwardly from the side plate 61 and carries within such bracket, a worm gear 87 (Figure 7) in mesh with the operating gear 73 on the counting mechanism shaft.

The various transfer wheels 89 for the totalizer counting mechanism, are mounted on a parallel shaft 91 supported between the worm gear bracket 85 and the opposite side plate 59.

Manual setting of the totalizer counting mechanism is provided through the expediency of a manual setting knob 93 (Figures 5, 7) mounted on a stem 95 which slidably passes through a boss 97 on the casing in line with the shaft 67 of the counting mechanism. This stem carries at its inner end a disk 99 having a pin 101 extending toward a disk 103 on the exposed end of the counter shaft.

This latter disk is provided with a notch 105 in the face thereof to receive the pin and provide a shoulder for transmitting rotational movement of the knob to the shaft of the totalizer counting mechanism in one direction only.

A compression spring 107 disposed between the boss 97 and the knob 93, normally tends to hold the pin out of engagement with the notched disk, whereby manual setting of the counting mechanism in question can only be realized through the application of pressure to the setting knob.

To make it possible to carry out the objects and purposes of the present invention, separate counting mechanism 109 (Figure 5) is provided which, by reason of its repeating function, will be designated the repeating counter. As a mounting support for the number wheels of this repeating counter, a pair of bushings 111, 113 are slidably mounted respectively, in the outer bracket plates 59, 61 in alignment with each other, with each of said bushings terminating in a heavy lateral flange 115 adjacent the inner surface of its associated bracket plate. At its outer end, each such bushing is pinned to the stem 117 of a knob 119 which is slidably supported in a boss 121 on the side wall of the housing. A compression spring 123 between such boss and the knob, tends to hold the bushing flange against the inner surface of its mounting plate.

Supported in such bushings for sliding movement of the bushings thereon, is a shaft 125 which passes through the intermediate bracket plate 63 at which point, the shaft is grooved to receive a pin 127 which has been driven in through the end of the bracket plate. This will prevent lateral shifting of such shaft.

To either side of the intermediate bracket plate, the shaft is surrounded by a sleeve 129 which sleeve carries one section 131 of the repeating counting mechanism.

Each such section includes a pair of number wheels 133, 135 (Figures 5, 6), each of different color, as, for example, the innermost one 135 carrying numbers of 1 to 0 in red, while the outermost one 133 carries a reversed series of like numbers in black. For identification, these will be designated as the red and black number wheels.

Considering that section to the left of the middle supporting plate as viewed from the front, there is disposed against the innermost side of the red number wheel, a ratchet wheel 137 and alongside this racket wheel there is a cam disk 139 of circular contour, having a flat spot 141 at one location thereon.

Between this cam disk and the middle bracket plate, the sleeve 129 carries a holding wheel 143 (Figures 5, 10) whose contour is defined by a plurality of symmetrical V notches in the edge thereof.

The red number wheel and its associated ratchet wheel, disk cam and holding wheel are united into a unit assembly by a connecting pin 145 through these various components.

Adjacent the black number wheel is a similar ratchet wheel 147 followed by a disk cam 149 having a flat spot 141 similar to that associated with the cam disk of the red number wheel. These latter components are likewise united into a unit assembly by a connecting pin 153, and this entire unit assembly, unlike the red number wheel assembly, is preferably keyed or otherwise affixed to the sleeve 129 so as to rotate in unison with such sleeve.

The right section of the repeating counter mechanism as viewed from the front, is similar to the left section, except for the inclusion of an additional cam disk 155 between each cam disk and associated ratchet wheel, with the flat spots of the additional cam disks occurring at the same location on the rim thereof as with the adjacent cam disks.

The unit assembly involving each red number wheel is normally caused to rotate with the adjacently disposed black number wheel by reason of a releasable connection existing between the black and red number wheels. Such releasable connection preferably takes the form of a ball check (Figure 5) releasably interlocking the adjacent red and black number wheels and involving a ball 157 disposed within one of the number wheels and entering a recess 159 in the face of the adjacent wheel and normally held in such engagement by a compression spring 161 within the unit assembly of the first wheel. Thus the red number wheel 135 will be caused to rotate with the adjacent black number wheel 133 in the absence of any restraint applied to the red number wheel or any of the components of its assembly. By exercising such restraint, however, the red number wheel of each section may be held stationary while adjustments of the black number wheel are made.

To effect such restraint, holding means (Figure 10) are provided for each of the unit assemblies involving a red number wheel, and such holding means includes the V notched holding wheel 143 of such assembly.

In conjunction with each such wheel, there is provided a bell crank lever 164 fulcrumed to the intermediate bracket plate 63 with one arm 165 terminating alongside its associated holding wheel, while the other 167 lies parallel to the roof 19 of the housing.

A roller 169 carried by the first mentioned arm of each bell crank lever engages the notched edge of the associated holding wheel 143 and is normally releasably held in such engagement by a spring 171 extending under tension between that arm of the bell crank lever and the front wall of the housing.

A holding knob 173 mounted on a stem 175 which extends down through the roof of the housing, terminates within the housing in a horizontal disk 177 of sufficient diameter to straddle the horizontal arms 167 of both bell crank levers. This knob, however, is normally held out of engagement with such levers by a compression spring 179 disposed between the knob and the roof of the housing. By depressing this holding knob, the rollers 169 will be forcibly held in engagement with their associated holding wheels 143, and under these conditions, the red number wheels 135 will be held against rotation, while allowing for adjustments of the associated black number wheels 133.

Intermittent rotational actuation of the red and black number wheels in response to flow of liquid through the meter, is brought about by a picker pawl assembly 181

(Figures 4, 9, 11, 12 and 13). Such assembly includes a rocker shaft 183 journaled in the side plates 59, 61. Mounted on this rocker shaft at spaced locations adjacent the inner surface of the side plates, are a pair of upwardly directed rocker arms 185, 187 in the upper ends of which is journaled a square shaft 189.

This square shaft serves as a mounting for a set of picker pawls 191, 193, 195, 197, preferably formed from a single stampling. As such, it comprises a back strip 199 adapted to lie flush against a surface of the square shaft, and from this back strip, extend the various picker pawls.

These correspond in number to the number of ratchet wheels 137 and 147 with each located in line with one of such ratchet wheels. There being four ratchet wheels in the embodiment of my invention under consideration, the picker pawl assembly will involve the four picker pawls previously indicated, the two outermost being directed, in one angular position of the square shaft, tangential to the upper rim of the associated ratchet wheels, while at the same time, the two inner picker pawls will be directed toward the lower rim of their associated ratchet wheels, but out of the line of engagement with the teeth thereon.

On each ratchet wheel, the notches defining the teeth are all of uniform depth except one 201, which is of greater depth than the others.

Each of the picker pawls is formed with an angular bend 203 at its ratchet wheel engaging end, with those pawls at the right as viewed from the front of the counter, having a slightly greater angle of bend than those at the left, whereby for all engagements of such picker pawls with the notches in their associated ratchet wheels, except the single deep notch, they will serve to hold the corresponding picker pawl at the left from engaging its associated ratchet wheel. The provision of a deep notch in the ratchet wheel associated with each of the picker pawls at the right, permits of a slight additional arcuate travel of the picker pawl assembly, sufficient to enable the corresponding picker pawl at the left to engage and operate its ratchet wheel. By so locating the deep notch that it will be engaged by its associated picker pawl when the adjacent number wheel registers 9 and is about to register 0, which is equivalent to 10, the number wheel of like color to the left will then be moved one notch.

The picker pawls are so mounted on the square shaft as to not only assure maintenance of proper alignment of these picker pawls with their respective ratchet wheels, but also to assure sufficient resiliency and flexibility to permit of a slight angular swing of each picker pawl without strain, as it urges the ratchet wheel through its angle of shift for each excursion of the picker pawl.

To accomplish, these objectives, the set of picker pawls is resiliently affixed to the square shaft by a pair of loose pins 207 passing through the back strip 199 and the square shaft 189, and carrying on their exposed ends, a compression spring 209 held under compression against the square shaft by a washer 211 retained on each pin by a cotter pin 213.

Lateral shifting of the picker pawls is avoided by providing the back strip with a pair of ball shaped bosses 215 engaging in holes 217 formed in the square shaft.

The necessary rocking movement of the picker pawl assembly in operating the number wheels of the repeating counter, is derived from an eccentric 219 (Figures 6, 7 and 20) mounted on the extremity of the shaft 67 which supports the totalizer counter. This eccentric is straddled by an arm 221 which is mounted on the extremity of the rocker shaft 183 and fastened thereto. Accordingly, as the totalizer counting mechanism shaft rotates in response to flow of liquid through the meter, the action of the eccentric will cause the picker pawl mechanism to oscillate to and fro with respect to the repeating counter mechanism.

The fact that the square shaft 189 is journaled in the rocker arms, allows of such shaft to be angularly shifted so as to bring the inner picker pawls into position for operative engagement with the lower rims of their associated ratchet wheels, while at the same time causing the outer picker pawls to be shifted to an inoperative position.

Such shifting of the picker pawls from their operative to inoperative positions and vice versa is accomplished through the agency of a Geneva type movement or mechanism (Figures 8, 16, 17, 18 and 19). A portion of this Geneva type mechanism is mounted on the square shaft adjacent one of the rocker arms, by turning down a portion of this shaft adjacent said arm to form a cylindrical section and assembling this portion of the Geneva mechanism thereon.

This portion of the Geneva type mechanism involves a gear sector 223 which is affixed to the square shaft by soldering the same to the shoulder formed by turning down that end of the shaft on which this portion of the Geneva mechanism is assembled. Adjacent to this gear sector, is a disk 225 having a pair of gear teeth 226 on the periphery thereof, of the same pitch as the teeth of the gear sector, and formed in the periphery of this disk in proximity to the gear teeth is a rectangular notch 227. This disk is rotatably mounted on the reduced end of the square shaft, but its rotational movement is limited to a small angle by a pin 229 extending laterally from the gear sector and entering this notch.

Adjacent this disk and also rotatably mounted on the reduced end of the square shaft, is an index lock disk 231 having a peripheral U-notch 232 in alignment with the valley between the two teeth on the adjacent disk 225. This index lock disk is provided with a pair of laterally extending actuating pins 233, 234, one of which passes through and is anchored in the adjacent disk 225 to maintain a fixed relationship between the two. The disk 225 and index lock disk 231 are held in their assembled relationship to the gear sector by a compression spring 235 disposed on the reduced end of the square shaft and held under compression between a pair of washers on the reduced end of this shaft.

A pinion 236 of thickness corresponding to the thickness of the aforementioned portion of the Geneva type assembly, is mounted on the end of a pinion arm 237, which in turn is affixed to the rocker shaft 183 for movement therewith. This pinion is always in mesh with the gear sector 223, while alternate teeth under the index lock disk are mutilated. With the periphery of the index lock disk occupying the space left by such mutilation, it will be apparent that any angular rotation of the index lock disk, as by exerting pressure or pull against one of the pair of laterally extending pins 233 or 234 thereon, will cause the adjacent disk 225 to move accordingly and engage the pinion with its two peripheral teeth 226, causing the pinion 236 to rotate and drive the gear sector 223 through the limited angle permitted by the notch 227 in the disk 225, thus resulting in an angular rotation of the square shaft.

The small U-notch 232 in the periphery of the index lock disk permits of such limited rotation of the pinion, following which further rotational movement of the pinion in the same direction is precluded by the absence of additional notches in the periphery of the index lock disk. Reverse movement, however, may be effected to restore the picker pawls to their previous positions.

Such angular shifting of the square shaft along with the picker pawls, is remotely controlled by certain of the cam disks associated with the repeating counter. Such remote control involves a shaft 239 journaled in the side plates above the square shaft. Journaled on this shaft is a cam follower in the form of a lever 241 (Figures 4, 6, 8 and 14) having one end riding the cam disk 155 while the other end extends to the rear of the counter to a point above a second shaft 243 supported between the end plates toward the rear thereof.

On this second shaft is journaled a collar 245 from one end of which projects a short shift lever 247 which is operatively connected to the end of the cam follower lever 241 by a connecting link 249. From the other end of the collar 245 there extends a push finger 251 in the upper edge of which there is formed a notch 253 in position to be engaged by the lower pin 234 in the index lock disk 231.

So long as the cam follower lever 241 rides the circular edge of the cam disk 155, the pusher finger will be held out of the path of engagement of the actuating pin 234 on the index lock disk, but will be lifted into the path of movement of such pin, when the cam follower is permitted to drop and ride the flat spot on the cam disk.

A similar pusher finger 254 adapted to push against the upper operating pin 233 of the index lock disk, has its lower edge provided with a notch 255 for this purpose. This pusher finger is fixed to the end of a collar 256, also mounted on the second shaft 243 but, unlike the first pusher finger, this one is fixed to the shaft by a pin 257 through the collar.

Its position with respect to the path of movement of its associated operating pin 233 is determined by a second cam follower 259 spaced from the first by a sleeve 258 and associated with a different one of the cam disks 155 on the repeating counter. This latter cam follower, like the previous one, is in the form of a lever journaled on the shaft and having one end riding the edge of the cam disk, while the other end extends to the rear of the counter to a point above the second shaft 234.

This cam follower is connected to a shift lever 261 affixed to the shift lever shaft 234, this latter shift lever extending in the opposite direction from the first described shift lever 247. The connection includes a connecting link 263. The hinge between this link and the cam follower is a slotted connection permitting operation through the link in tension only. A light compression spring 265 about the link between the cam follower lever and a pin 267 anchored in the link, serves to hold the cam follower at the upper end of the connecting link.

Maintained engagement of each of the aforementioned cam followers against its associated cam disk is assured by a coil spring 269 connected under tension between a crank arm 271 on its associated cam follower, and the front wall of the housing in a manner to hold the cam follower against the rim of the cam disk.

When either of the cam followers is permitted to engage the flat spot on its associated cam disk, it will cause its associated pusher finger to be rotated into the path of movement of one of the operating pins on the index lock disk, which during a return movement of the picker pawl assembly, will engage in the notch of such pusher finger and cause the index lock disk to partially rotate and bring about the angular shift of the picker pawl assembly in the manner previously described.

To assure that the upper pusher finger 254 will be out of the path of movement of its associated pin on the index lock disk when the lower pusher finger is to function, it is provided with a pin 273 extending laterally in the path of upward movement of the lower pusher finger, so that when this lower pusher finger is elevated to its operating position, it will lift the other pusher finger out of its operating position, if, for some reason or other, it has previously failed to be so elevated.

It will be apparent from the foregoing description of the picker pawl shift mechanism that the function thereof is to cause a reversal of rotation of the counter wheels of the repeating counter from their previous direction of rotation.

Along with this picker pawl shift mechanism, there is incorporated into the repeating counter, mechanism (Figures 4, 6 and 9) for tripping the latching mechanism which holds the main valve in its open position during a filling operation. Such tripping mechanism, like the shift mechanism, is operated or remotely controlled from the cam disks which are incorporated in the repeating counter.

Adjacent the cam follower lever 241 is a cam follower 275 pinned to the shaft 239 and riding the cam disk 149 associated with the right black number wheel, as viewed from the front. A lateral tab 276 on the lever 241 spans the adjacent follower 275, thus exercising control over the same.

The left black number wheel has associated with its cam disk 149, a cam follower 277 which is likewise pinned to the shaft and formed with a crank arm 278 connected by a tension spring 279 to the front wall 21, this latter cam follower, however, having a tail section 280 extending rearwardly. Thus both cam followers 275 and 277 can only move in unison, and this can be permitted only when the flat spots on both associated cam disks face their followers simultaneously.

Adjacent the cam follower lever 259, is a cam follower 281 affixed to the end of a centrally located sleeve 283 on the shaft 239, and like follower 275, it is spanned by a lateral tab 285 extending from the lever 259.

At the opposite end of this central sleeve, is affixed another cam follower 287 which rides the cam disk 143 in the plane thereof. This cam follower, like cam follower 277, has a tail section 289 extending rearwardly, and a crank arm 291 connected by a tension spring 293 to the front wall 21 of the housing.

The two tail sections 280 and 289 are relied on to initiate the tripping of the latch mechanism, when either is permitted to lift, which occurs when the adjacent cam follower and associated follower on the other side of the bracket wall 63 drop to the flat spot on their respective cam disks.

Across these tail sections, rests a lift bar 295 which is carried by a pair of rearwardly directed levers 297 and 299 journaled on the shaft 239. To one of these is connected one end of an L-shape lift link 301, the other end of which connects to an intermediate point on a pawl release hook 303. This hook, at its tail end, is pinned to the upper end of the latching pawl 49 by a pin 305, and is of a length to locate the hook end beneath an engageable pull disk 307 on the shaft 67 of the totalizing counter 71.

This disk is of spiral contour to form a radially extended shoulder 309 adapted to engage the hook 303, when the hook is raised into the path of movement of the shoulder. This occurs when the lift link 301 is pulled up by movement of the lever 299.

It will be apparent, when this event takes place, the pull disk will engage the hook and pull the same forward, which action will, in a positive manner, release the pawl 49 from engagement with the cam 45 and free the main flow control valve 5, thus enabling the same to close.

To realize proper and accurate working of the counter, the flat spots on the cam disks are determined such that when any such flat spot appears under a follower, the zero reading on the associated number wheel will appear at the opening or window through which such wheel is read.

In utilizing the counter for its intended purpose, the number wheels are rotated until both red wheels indicate zero. The holding button is then pressed down and held in this position while the black number wheels are rotated to designate the number of gallons desired for each filling cycle. When thus adjusted, the main flow valve is opened and will automatically be latched in its open position by the latching pawl 49. The resulting flow of liquid through the meter 3 will, through the rotative force applied to the gear 77, set the counting mechanism in operation, both as to the totalizing counter and the repeating counter. The black number wheels will decrease in value toward zero to complete a filling operation, while the red number wheels will simultaneously increase in value from their initial zero reading to that value representing a filling operation.

When the black number wheels reach their zero reading positions, their associated cam disks will present their flat spots beneath the associated followers which permits them, in response to the spring pull thereon, to drop, whereupon two things happen simultaneously.

In the reversing mechanism, the position of the fingers 251 and 253 will be switched to effect a reversal of the picker pawl assembly during its next movement away from the number wheels, while in the latch tripping mechanism, the lift link 201 will be raised to effect a tripping action within the next rotation of the shaft in the totalizing counter. To start the next filling operation, all that is required is to relatch the valve to its open position.

To assure release of the hook 303, after it has been pulled forward sufficiently to trip the latch, a cam lever 311 of the bell crank type is mounted on a stub shaft 313 anchored in the bracket arm 41. One arm 314 of this cam lever extends alongside the pawl release hook 303 and provides a downwardly sloping cam surface along its under edge for a lateral tab 315 extending outwardly from the hook, the effect of which is to gradually withdraw the hook from engagement with the pull disk, as the hook is pulled forward. To stabilize the cam arm against lifting, the other arm 316 is adapted to abut the cam 45.

Prior to any readjusting of the counter wheels of the repeating counter to obtain a different discharge value, it is essential to assure that the picker pawl assembly be in position to deduct from the black number wheels and add to the red number wheels on the first run.

A disk 317 mounted on the end of the shaft 243 is connected thereto by a spiral spring 319, whereby angular rotational movement of this disk will result in corresponding movement of the shaft 243, unless such shaft be restrained as would be the case with the picker pawl assembly at the end of a return stroke. When in engagement with the ratchet wheels of the repeating counter, however, the shaft can turn and with it shift the upper push finger 253 into position for engagement by the pin 233 to reverse the picker pawl assembly position, if not already in the desired position.

Such movement of the disk 317 is controlled from the totalizer knob 93. A lever 321 mounted at an intermediate point thereof, on a stub shaft 323 extending from the side plate 61, has one end resting in a notch 325 in the disk 317, and its other end on the periphery of a cam 325 forming a component of an assembly rotatably mounted on the inner surface of the end wall 17 of the housing.

This assembly includes in addition to the cam 325, a gear 327 and a timing disk 329, all pinned together. The cam is of circular contour with a single notch in which the associated end of the lever 321 will normally lay. Upon rotation of the cam, this end of the lever will be lifted from the notch to ride the circular portion of the cam, thus causing the lever, at its other end, to depress and rotate the disk 317 through an angle, which position it will hold for a complete revolution of the cam.

Rotation of the cam 325 is brought about through a pinion 331 on the shaft of the knob 93. This pinion is in mesh with the gear 327 and normally extends into the plane of the timing disk 329 which is notched to receive the pinion. This makes rotation of the pinion impossible until push out of the plane of the timing disk, which will occur when the knob 93 is pushed inwardly to effect an operative connection with the totalizer counter. Thereafter, upon rotation of the knob, the unnotched portion of the timing disk will move in between the pinion and the wall of the housing and hold the knob in, until a complete rotation thereof has been made, at which moment, the knob, due to its spring 107, will drop out of engagement. Within this time period of one revolution, the picker pawl assembly will have completed an oscillation and the upper push finger will have been held down long enough to effect the desired reversal.

If perchance, one desires to temporarily interrupt a filling operation, all that is necessary is to press the knob 57 which actuates the pawl trip lever 56 and thereby releases the valve and permits it to close. Upon relatching the valve to open position, the interrupted filling operation will then proceed to completion.

It will be apparent from the foregoing that the invention, as described, is subject to alteration and modification without departing from the underlying principles involved, and accordingly, while I have described the same in considerable detail, I do not desire to be limited in my protection to such details except as may be necessitated by the appended claims.

I claim:

1. A repeating counter including a first set of number wheels of a distinguishing color and having numerical indicia from zero to nine; a second set of number wheels of a different color and having similar numerical indicia but in reverse sequence from the indicia of the wheels of the first set; means supporting said sets of number wheels in axial alignment; means for operating both sets of number wheels in unison to increase the reading on one set while simultaneously decreasing the reading on the other set, said means comprising a ball check interlocking each number wheel of one set with the corresponding number wheel of the other set; means for holding each number wheel of one set following adjustment thereof to permit of the independent adjustment of the corresponding number wheel of the other set, means for intermittently rotating said number wheels in one direction until one set indicates a zero reading; and means for then reversing said direction of rotation until the other set indicates a zero reading.

2. A repeating counter including a first set of number wheels of a distinguishing color and having numerical indicia from zero to nine; a second set of number wheels of a different color and having similar numerical indicia but in reverse sequence from the indicia of the wheels of the first set; means supporting said sets of number wheels in axial alignment; means for operating both sets of number wheels in unison to increase the reading on one set while simultaneously decreasing the reading on the other set, said means comprising a ball check interlocking each number wheel of one set with the corresponding number wheel of the other set; means for holding each number wheel of one set following adjustment thereof to permit of the independent adjustment of the corresponding number wheel of the other set, said means including a holding wheel connected to each of those number wheels to be held and having a plurality of notches in the periphery thereof, and manually actuable means for engaging said holding wheels to preclude turning thereof and associated connected number wheels while the corresponding number wheels of the other set are adjusted; means for intermittently rotating said number wheels in one direction until one set indicates a zero reading; and means for then reversing said direction of rotation until the other set indicates a zero reading.

3. A repeating counter including a first set of number wheels of a distinguishing color and having numerical indicia from zero to nine; a second set of number wheels of a different color and having similar numerical indicia but in reverse sequence from the indicia of the wheels of the first set; means for operating both sets of number wheels in unison to increase the reading on one set while simultaneously decreasing the reading on the other set, a ratchet wheel associated with each number wheel of one set and a ratchet wheel associated with each number wheel of the other set, the ratchet wheels of one set being reversed with respect to those of the other set; a picker bar having a plurality of picker pawls extending from said bar in the direction of said ratchet wheels, certain of said picker pawls being directed tangentially toward the teeth of the ratchet wheels of one set while the other of said picker pawls are directed toward substantially diametrically opposite points on said reversed ratchet wheels but out of line with the teeth thereof; means for oscillating said picker bar toward and away from said number wheels to cause intermittent rotation of said number wheels in one direction; and means responsive to a zero, indicating position of all number wheels of one set for producing a rotational shift of said picker bar to swing said first picker pawls out of line with the teeth of their associated ratchet wheels while bringing the previously out-of-line picker pawls into line with the teeth of their associated ratchet wheels to reverse direction of intermittent rotation of said number wheels.

4. A repeating counter including a first set of number wheels of a distinguishing color and having numerical indicia from zero to nine; a second set of number wheels of a different color and having similar numerical indicia but in reverse sequence from the indicia of the wheels of the first set; means for operating both sets of number wheels in unison to increase the reading on one set while simultaneously decreasing the reading on the other set, said means comprising a ball check interlocking each number wheel of one set with the corresponding number wheel of the other set, means for holding each number wheel of one set following adjustment thereof, to permit of the independent adjustment of the corresponding number wheel of the other set, said means including a holding wheel connected to each of those number wheels to be held and having a plurality of notches in the periphery thereof, and manually actuable means for engaging said holding wheels to preclude turning thereof and associated connected number wheels while the corresponding number wheels of the other set are adjusted; a ratchet wheel associated with each number wheel of one set and a ratchet wheel associated with each number wheel of the other set, the ratchet wheels of one set being reversed with respect to those of the other set, a picker bar having a plurality of picker pawls extending from said bar in the direction of said ratchet wheels, certain of said picker pawls being directed tangentially toward the teeth of the ratchet wheels of one set while the others of said picker pawls are directed toward substantially diametrically opposite points on said reversed ratchet wheels but out of line with the teeth thereof; means for oscillating said picker bar toward and away from said number wheels to cause intermittent rotation of said number wheels in one direction; and means responsive to a zero indicating position of all number wheels of one set for producing a rotational shift of said picker bar to swing said first picker pawls out of line with the teeth of their associated ratchet wheels while bringing the previously out-of-line picker pawls into line with the teeth of their associated ratchet wheels to reverse direction of intermittent rotation of said number wheels.

5. A repeating counter including a first set of number wheels of a distinguishing color and having numerical indicia from zero to nine; a second set of number wheels of a different color and having similar numerical indicia but in reverse sequence from the indicia of the wheels of the first set; means for operating both sets of number wheels in unison to increase the reading on one set while simultaneously decreasing the reading on the other set, said means comprising a ball check interlocking each number wheel of one set with the corresponding number wheel of the other set; means for holding each number wheel of one set following adjustment thereof to permit of the independent adjustment of the corresponding number wheel of the other set, said means including a holding wheel connected to each of those number wheels to be held and having a plurality of notches in the periphery thereof, and manually actuable means for engaging said holding wheels to preclude turning thereof and associated connected number wheels while the corresponding number wheels of the other set are adjusted; ratchet wheel associated with each number wheel of one set and a ratchet wheel associated with each number wheel of the other set, the ratchet wheels of one set being reversed with respect to those of the other set, a picker bar having a plurality of picker pawls extending from said bar in the direction of said ratchet wheels, certain of said picker pawls being directed tangentially toward the teeth of the ratchet wheels of one set while the others of said picker pawls are directed toward substantially diametrically opposite points on said reversed ratchet wheels but out of line with the teeth thereof; means for oscillating said picker bar toward and away from said number wheels to cause intermittent rotation of said number wheels in one direction; means responsive to a zero indicating position of all number wheels of one set for producing a rotational shift of said picker bar to swing said first picker pawls out of line with the teeth of their associated ratchet wheels to reverse direction of intermittent rotation of said number wheels; latching means for connection to a line valve for holding such valve in open condition, said latching means including a pawl and latching cam; and means for tripping said latching means when either set of number wheels reaches a zero indication position.

6. A repeating counter including a first set of number wheels of a distinguishing color and having numerical indicia from zero to nine; a second set of number wheels of a different color and having similar numerical indicia but in reverse sequence from the indicia of the wheels of the first set; means for operating both sets of number wheels in unison to increase the reading on one set while simultaneously decreasing the reading on the other set, said means comprising a ball check interlocking each number wheel of one set with the corresponding number wheel of the other set; means for holding each number wheel of one set following adjustment thereof to permit of the independent adjustment of the corresponding number wheel of the other set, said means including a holding wheel connected to each of those number wheels to be held and having a plurality of notches in the periphery thereof, and manually actuable means for engaging said holding wheels to preclude turning thereof and associated connected number wheels while the corresponding number wheels of the other set are adjusted; a ratchet wheel associated with each number wheel of one set and a ratchet wheel associated with each number wheel of the other set, the ratchet wheels of one set being reversed with respect to those of the other set, a picker bar having a plurality of picker pawls extending from said bar in the direction of said ratchet wheels, certain of said picker pawls being directed tangentially toward the teeth of the ratchet wheels of one set while the others of said picker pawls are directed toward substantially diametrically opposite points on said reversed ratchet wheels but out of line with the teeth thereof; means for oscillating said picker bar toward and away from said number wheels to cause intermittent rotation of said number wheels in one direction; means responsive to a zero indicating position of all number wheels of one set for producing a rotational shift of said picker bar to swing said first picker pawls out of line with the teeth of their associated ratchet wheels while bringing the previously out-of-line picker pawls into line with the teeth of their associated ratchet wheels to reverse direction of intermittent rotation of said number wheels; latching means for connection to a line valve for holding such valve in open condition, said latching means including a pawl and latching cam; and means for tripping said latching means when either set of number wheels reaches a zero indication position, said means comprising a cam disk connected for movement with each of said number wheels, said cam disks each having a like cam section located equally distant from the zero indication on the associated number wheel, and means responsive to the aligning up of cam surfaces of the cam disks associated with any set of number wheels for disengaging said pawl from engagement with said latching cam.

References Cited in the file of this patent

UNITED STATES PATENTS

| | | |
|---|---|---|
| 1,349,256 | Bechtold | Aug. 10, 1920 |
| 2,099,463 | Bradley | Nov. 16, 1937 |
| 2,137,013 | Bradley | Nov. 15, 1938 |
| 2,196,805 | Berck | Apr. 9, 1940 |
| 2,322,712 | Hazard | June 22, 1943 |
| 2,544,809 | Stanley | Mar. 13, 1951 |